Dec. 13, 1966  YAO TZU LI ETAL  3,290,945
DIFFERENTIAL PRESSURE RESPONSIVE DEVICE
Original Filed Aug. 21, 1961  5 Sheets-Sheet 1

INVENTORS
YAO TZU LI
SHIH-YING LEE
BY
ATTORNEYS

FIG. 11

Dec. 13, 1966     YAO TZU LI ETAL     3,290,945

DIFFERENTIAL PRESSURE RESPONSIVE DEVICE

Original Filed Aug. 21, 1961     5 Sheets-Sheet 4

INVENTORS
YAO TZU LI
SHIH-YING LEE
BY

ATTORNEYS

Dec. 13, 1966 YAO TZU LI ETAL 3,290,945
DIFFERENTIAL PRESSURE RESPONSIVE DEVICE

Original Filed Aug. 21, 1961 5 Sheets-Sheet 5

FIG. 15

INVENTORS
YAO TZU LI
SHIH-YING LEE
BY
Kenway, Jenney + Hildreth
ATTORNEYS

United States Patent Office 3,290,945
Patented Dec. 13, 1966

3,290,945
DIFFERENTIAL PRESSURE RESPONSIVE DEVICE
Yao Tzu Li and Shih-Ying Lee, both of Huckleberry Hill, Lincoln, Mass.
Original application Aug. 21, 1961, Ser. No. 132,926. Divided and this application June 4, 1965, Ser. No. 473,265
7 Claims. (Cl. 73—407)

This is a division of application Serial No. 132,926, filed August 21, 1961, now abandoned.

This invention relates to a novel and improved differential fluid pressure responsive device, more specifically, a transducer of a type utilizing a displaceable differential fluid pressure sensing member and force sensing means for converting the displacement of said sensing member to a signal representative of the differential fluid pressure being sensed.

Various means have been provided in the past for the measurement of differential fluid pressures. One of the best known is, of course, manometer tubes. Manometer tubes, however, are not well adapted for use when the individual pressures sensed are relatively high, say on the order of 3000 p.s.i. Another method is simply to use a single bellows or diaphragm, which is subjected to the individual pressures on the opposite sides thereof, with the position of the bellows being representative of the differential pressure. However, such a device is highly susceptible to blowout when the differential pressure surges. Another method of measuring differential fluid pressure involves the use of two bellows or diaphragms which are mechanically connected for movement together. The bellows are internally loaded by the fluids, the differential pressure of which it is desired to determine. With such a device, both the bellows or diaphragms must be exactly equal in effective area in order to provide accurate results. Also, each of the bellows must be strong enough to withstand the entire fluid pressure exerted internally thereof, inasmuch as the bellows are normally exposed to atmospheric pressure on their outer surfaces. As the bellows must be quite rugged, they will have a relatively high stiffness with an attendant low sensitivity in the overall device. Lastly, there have been developed devices in which a pair of bellows are mounted on a common supporting member with the interior of the bellows being in communication with each other and being filled with a substantially incompressible fluid. Each of the bellows extends into a fluid chamber into which a pressurized fluid may be introduced to act externally on the bellows. The ends of the bellows are connected together for simultaneous movement. While such a device overcomes some of the problems in the previously described devices, it has the distinct disadvantage that any thermal expansion of the fluid within the bellows cannot be relieved, because of the tying together of the ends of the bellows, with the result that undesirably high internal stresses are induced in the bellows.

Where differential fluid pressure responsive devices, of the type described above, are utilized in a differential fluid pressure transducer, it is usual to provide some means for converting the motion or position of the differential fluid pressure sensing means to a signal. One method accomplishing this is to provide force sensing means, such as a strain gage device, externally of the fluid pressure responsive device and to provide force transmitting means, in the form of a linkage or the like, between the differential fluid pressure sensing means and the force sensing means.

In connection with the differential fluid pressure sensing means of such a transducer, it is desirable to provide means for limiting the differential pressure which can be exerted on the differential pressure sensing member, in order to avoid inadvertent rupture due to pressure surges. In order to assure accurate and reliable preformance over the complete nominal range of the transducer, the maximum differential pressure should be in excess of the nominal range of the transducer. For example, if the transducer has a nominal rating of from 0–10 p.s.i., the maximum differential pressure might be 20 p.s.i. Also, in order to avoid inadvertent damage to the force sensing means, it is desirable to limit the force which may be applied to the force sensing means by the differential fluid pressure sensing means. Generally speaking, the maximum force which the differential fluid pressure sensing means can transmit to the force sensing means should correspond to a differential pressure at least slightly greater than the maximum nominal rating of the transducer. It is important that the force limiting means have the characteristic of complete recovery of its force transmitting ability after an overload force has been removed.

Accordingly, it is an object of this invention to provide a novel and improved differential fluid pressure sensing transducer including differential fluid pressure responsive means, and force sensing means responsive to said differential fluid pressure responsive means, and in which means are provided for the protection of the differential fluid pressure responsive means for overload pressure surges and means are also provided to limit the force which may be applied to the force sensing means by the differential fluid pressure responsive means.

It is another object of this invention to provide a novel and improved fluid pressure responsive device, adapted for use in a transducer of the type just described, which will provide accurate continuous response to differential fluid pressures of relatively low magnitudes even though the individual fluid pressures may be of high magnitude.

It is a further object of this invention to provide novel and improved force limiting means, and more particularly, a novel and improved force transmitting connector, which will have a force transmissibility of unity over a first initial range of forces but which will have a force transmissibility of substantially less than unity when the loading on the force transmitting means exceeds a predetermined value in excess of said initial range.

It is another object of this invention to provide force transmitting means of the type just described in which, following overload of the force transmitting means, the transmissibility thereof will return to unity upon removal of the overload force.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
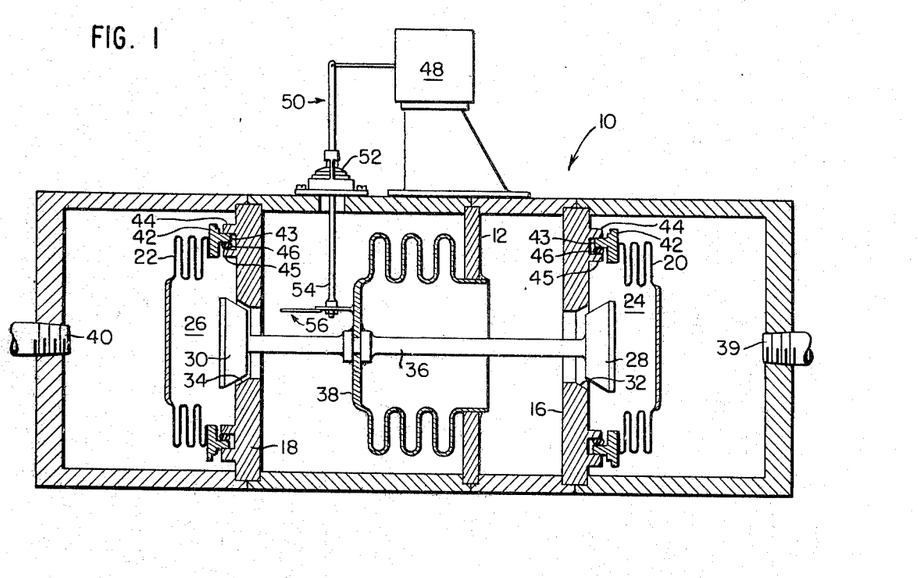
FIG. 1 is a longitudinal cross sectional view of a differential fluid pressure sensing transducer incorporating the invention.

With reference to the drawings, and particularly FIG. 1, a differential fluid pressure sensing transducer constructed in accordance with the present invention comprises, a sealed, rigid walled housing 10, generally in the form of a cylinder. Within the housing are provided two fluid tight expansible chambers of equal volume which are formed, in part, by a common wall or partition 12 extending radially of the housing and on which is mounted a bellows 14. The bellows extends coaxially of the housing with the open end of the bellows extending through a central aperture in the partition 12. As further can be seen from FIG. 1, the housing is provided with a pair of radially extending partitions or walls 16 and 18 which are disposed respectively on opposite sides of the partition 12. A pair of input bellows 20 and 22 are mounted on the walls 16 and 18, respectively, and on the sides thereof remote from the bellows 14. The interiors 24 and 26 of the bellows 20 and 22 are thus separated from the corresponding sides of the bellows 14 by the walls 16 and 18.

In order to provide and control fluid flow communication between the interior of the bellows 20 and 22, and the respectively associated sides of the bellows 14, a pair of valve members 28 and 30 are provided. The valve members are disposed on the sides of the walls 16 and 18 remote from the bellows 14 and are located interiorly of the bellows 20 and 22. The valve members are respectively associated with a pair of valve seats 32, 34 formed by the bordering edge portions of apertures in the walls 16 and 18. The valve seats are arranged coaxially of the bellows 12. A valve stem or rod 36 is joined at its opposite ends to the valve members 28 and 30, and is supported in sealed relation on the movable end wall 38 of the bellows 14 whereby the valve members 29 and 30 are supported for simultaneous movement with the bellows 14.

The above referenced two sealed chambers of equal volume are formed in one case by the interior of the bellows 14, the space between the walls 12 and 16 and the interior of the bellows 20. The other chamber is formed by the space between the walls 12 and 18 externally of the bellows 14 and the interior of the bellows 22. These chambers are filled with an incompressible fluid such as silicone oil whereby pressures exerted on the exterior of the bellows 20, 22 will be transmitted to the opposite sides of the bellows 14. It should be noted that when the differential pressure across the bellows 14 is zero, the valve members 28 and 30 will be equally spaced from the respective valve seats. A pair of fluid inlet fittings 39, 40 are provided at the ends of the housing. By means of these fittings the fluid, the differential pressure of which it is desired to determine, may be introduced into the housing externally of the bellows 20 and 22.

In the operation of the differential fluid pressure responsive portion of the transducer just described, it will be assumed that the higher of the two pressures being measured is connected to the input fitting 40 while the lower of the two pressures is connected to the input fitting 39. In accordance with the invention, both the bellows 20 and 22 should be provided with a stiffness which is as low as is practically possible, consistent with good engineering practice. It is desired that the stiffness of these bellows be sufficiently low that the fluid pressure on both sides of the bellows will be substantially equal. With the higher of the two fluid pressures being exerted on the exterior of the bellows 22, the bellows 22, 20 will be displaced to the right by an amount determined by the magnitude of the differential pressure across the bellows 14 and the stiffness of the bellows 14. In this connection, the bellows 14 should be substantially stiffer than the bellows 20 and 22. So long as the differential fluid pressure across the bellows 14 remains within the normal range of the transducer, the wall 38 of the bellows will move toward and away from the partition 12 is response to changes in the differential pressure. The valves 28 and 30 will, of course, move simultaneously with the bellows 14. It will be apparent from FIG. 1 that if the pressure in the sealed chamber associated with the bellows 22 exceeds the pressure in the sealed chamber associated with the bellows 20 by a certain amount, the wall 38 of the bellows 14 will be moved to the right, as viewed in FIG. 1, sufficiently to seat the valve 30 on the valve seat 34. Any further increase of the pressure in the bellows 22 will merely cause the valve 30 to be seated more firmly. No further flow of liquid into the chamber portion to the left of the bellows 14 will be permitted. The pressure of the incompressible liquid trapped between the valve 30 and bellows 14 will thus remain at the value it was when the valve 30 was seated. Thus, even though the pressure externally of the bellows 22 is increased, the pressure externally of the bellows 14 will not be increased any further, and accordingly, the bellows 14 will not be displaced any further to the right. It will, of course, be understood that the same mode of operation will prevail in the event that the fluid pressure in the sealed chamber associated with the bellows 20 is higher than the fluid pressure in the sealed chamber associated with the bellows 22.

Thus, it can be seen that the differential fluid pressure responsive device of this invention utilizes a single resiliently displaceable or deformable member to sense differences in fluid pressure on the opposite sides of the displaceable member, and includes means for sealing the displaceable member from the higher of the pressures being sensed when the differential pressure exceeds a predetermined value. Thus, the sensing member is protected from blowout or inadvertent rupture in the event of a surge of pressure. Also, it should be noted that with the construction just described, in the event that there is a thermal expansion of the fluid filling the two sealed expansible chambers of equal volume the bellows 20 and 22 will merely be expanded to compensate for the increase in volume of the fluid and eliminate any attendant undesirably high internal stresses in the sensing bellows 14. In this connection, it is important that these two chambers be of equal volume. This is difficult to accomplish precisely due to usual manufacturing tolerances. Accordingly, the bellows 20 and 22 are adjustably mounted on the walls 16 and 18 to provide for selective individual adjustment of the volume within the respective sealed chambers in order to assure equal volumes in these chambers. More specifically, the open end of each of the bellows is mounted on a ring 42 having an annular projection 43 extending coaxially of the bellows. The exterior or peripheral surface of each projection 43 is received in press fit engagement within an annular projection in ring 44 on the wall 16 or 18 mounting the bellows. Each ring 43 is adjustable relative to the ring 44 in which it is received in a direction toward or away from the next adjacent wall 16 or 18 so as to vary the volume of the associated expansible sealed chamber. A second ring 45 is provided on each of the walls 16 and 18. Each ring 45 is located concentrically of and within one of the rings 44 and is radially inwardly spaced from the annular projection 43 on the bellows mounting ring 42. A seal or O-ring 46 is engaged between each ring 45 and the next adjacent annular projection 43 to prevent fluid leakage around the open end of the bellows. As noted above, the pressure drop across the bellows 20, 22 is preferably quite small so that the simple sealing provisions shown will be adequate for the purpose.

In determining any adjustment which is required to assure equal volume of the expansible chambers in the opposite sides of the bellows 14, the chambers are first filled with an incompressible fluid. With equal pressures acting externally of the bellows 20, 22, the sealed chambers are heated to cause an expansion of the fluid therein. If the volumes of the chambers are not equal, there will be a displacement of the bellows 14 which can be detected by means to be hereinafter described. In order to equalize the volumes of the chambers, one of the bellows 20 or 22 is adjusted toward or away from the wall mounting the same and the liquid in the associated chamber is removed or added through suitable fill openings, not shown, to compensate for the change in volume. By this means, a precise adjustment of the volume of the chamber may be obtained until there is no displacement of the bellows 14 when the liquid in the two chambers is heated.

The total range of movement permitted the bellows 14 should be greater than that corresponding to the nominal rating of the device. For example, if the device is nominally rated to measure differential fluid pressures from 0–10 p.s.i., the point at which the bellows 14 will be sealed from the higher pressure might be when the differential pressure reaches 20 p.s.i. In this event, the movement of the diaphragm 14 from its rest position, in either direction, sufficient to seat one of the valves will be equal to the movement of the bellows corresponding to a 20 p.s.i. pressure differential. It will be apparent from the above that the fluids, the pressure of which is being measured, do not, at any time, contact valves 28 and 30, but rather are sealed therefrom by the input bellows 20 and 22. Consequently, no dirt can enter the interior of the expansible sealed chambers of equal volume and cause malfunction of the bellows 14 or interfere with the proper seating of the valves 28 and 30.

Figure 2:
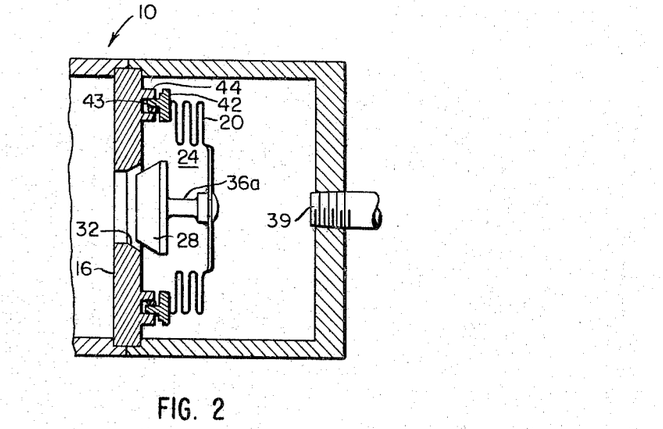
FIG. 2 is a fragmentary cross sectional view of a portion of the transducer of FIG. 1 illustrating an alternative construction.

With reference to FIG. 2, there is shown a modification of the means for sealing the sensing bellows from the higher input fluid pressure. In the embodiment of FIG. 2, the valve 28 is shown mounted by a valve stem 36a on the displaceable end wall of the bellows 20. It will be understood that the valve member 30 is similarly mounted on the displaceable end wall of the bellows 22. Inasmuch as the bellows 20 and 22 are, in effect, rigidly connected by the substantially incompressible fluid on the opposite sides of the diaphragm 14, the end walls of the input bellows will move in unison in response to changes in the differential pressure of the fluids in the input bellows. Accordingly, the valves 28 and 30 will be moved simultaneously in accordance with changes in the differential fluid pressure across the sensing bellows 14, even though they are not mounted on the sensing bellows as in the embodiment of FIG. 1. The purpose and operation of the valve 28 in FIG. 2 is, of course, the same as the purpose and operation of the valve 28 in FIG. 1, and thus will not be further described.

While various means such as a pointer and dial, might be used to provide, externally of the housing 10, an indication of the differential pressures sensed by the bellows 14, in the specific embodiment of FIG. 1, we use force sensing means of the strain gage type as shown in our U.S. Patent No. 2,913,692, issued December 17, 1956. Force transmitting means are provided to connect the force sensing means 48 and the sensing bellows 14. Specifically, a linkage 50 connects the force sensing means 48 to one end of motion transmitting means 52. The motion transmitting means 52 is of the type covered by U.S. Patent No. 2,781,665, issued February 19, 1957, in the name of Yao T. Li. The motion transmitting means 52 is particularly adapted to transmit motion from within a sealed enclosure to a device externally of the sealed enclosure without impairing the fluid tight integrity of the enclosure. A rod 54 is connected at one end to the inner end of the motion transmitting means 52 inside the housing 10. The other end of the rod 54 is connected by a force limiting connector 56 to the bellows 14. As the bellows 14 is moved in either direction from its rest position, the movement of the end wall 38 of the sensing bellows will be transmitted, as a force, through the connector 56, rod 54, etc. to the force sensing means 48 which will provide an electrical signal representative of the differential pressures sensed across the sensing bellows 14.

Figures 3, 4:
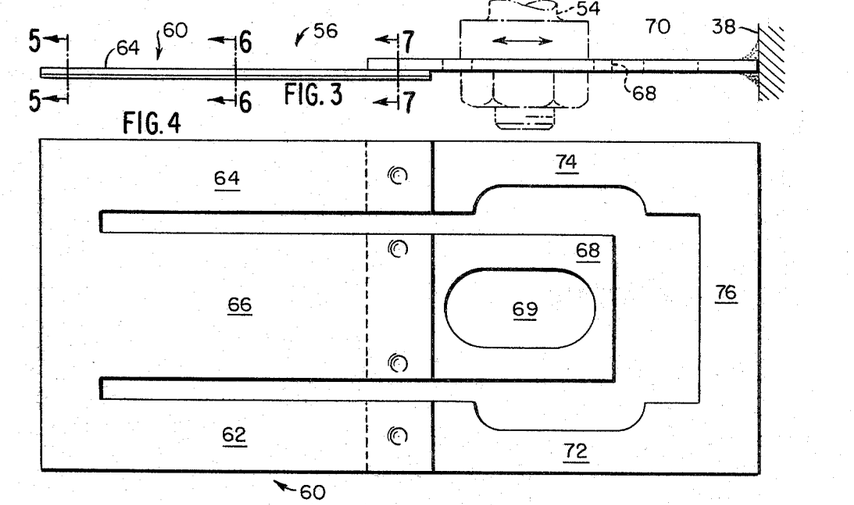
FIG. 3 is an enlarged side view of the force transmitting connector of the transducer of FIG. 1.
FIG. 4 is a plan view of the connector of FIG. 3.
Figure 5:
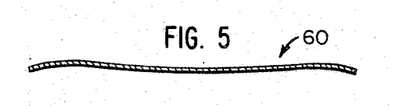
FIG. 5 is a cross sectional view substantially along the line 5—5 of FIG. 3.
Figure 6:
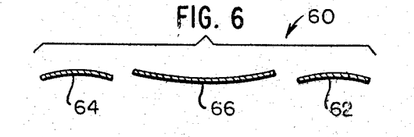
FIG. 6 is a cross sectional view substantially along the line 6—6 of FIG. 3.
Figure 7:
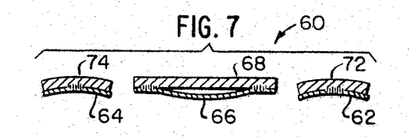
FIG. 7 is a cross sectional view substantially along the line 7—7 of FIG. 3.

As indicated above, one of the aspects of this invention is the provision of means for limiting the force imposed on the force sensing means 48 by the bellows 14 in order to preclude any inadvertent damage to the force sensing means. The force limiting connector 56 provides this function. With reference to FIGS. 3–7, the force limiting means 56 of this invention comprises a thin generally rectangular metal member, generally indicated at 60. As clearly shown in FIG. 4, the member 60 is provided with a pair of parallel spaced apart slots extending from one end thereof and terminating short of the other end of the member. These slots divide the member 60 into a pair of parallel spaced apart elongated members 62 and 64, and a center third elongated flexible member extending parallel to and between the members 62 and 64 in spaced relation. The elongated members 62, 64 and 66, as shown in FIG. 3, lie in a common general plane. The unslotted end of the member 60 provides a web-like portion joining one end of the center member 66 with the corresponding ends of the members 62 and 64. As apparent from FIGS. 6 and 7, the width of the center member 66 is approximately twice the width of either of the outside members 62 and 64. Also, as will be apparent from these figures, the center member 66 is provided with a convexo-concave cross section, as are the members 62 and 64. In the embodiment of FIGS. 3–9 the concave side of the members 62 and 64 face in the same direction and oppositely of the concave side of the center member 66. However, this is not essential, and the concave sides of the members 62, 64 and 66 may face in the same direction. As can be seen from FIG. 5, the cross sectional curvatures of the members 62, 64 and 66 is carried over into the web-like portion of the plate 60 joining the ends of these members.

With reference to FIGS. 3 and 4, the connector 56 further comprises a tab-like portion 68 welded to the free end of the center member 66. The tab 68 extends outwardly from the free end of the member 66 and lies in the same general plane as the center member. As can be seen in FIG. 3, the tab 68 is substantially thicker than the center member 66 and is provided with an aperture 69 through which the rod 54, previously described, extends. The rod 54 is provided with a shoulder abutting one side of the tab 68 and a nut is threadably engaged with the free end of the rod 54 and with the underside of the tab 68 to firmly connect the rod 54 for movement with the tab in a direction parallel to the common general plane of the members 62, 64 and 66, as indicated by the double ended arrow in FIG. 3. A second tab-like member 70 is connected, such as by welding, to the members 62 and 64. The member 70 comprises a pair of arms 72 and 74 connected at one end, respectively, to the members 62 and 64, and a connecting web 76 connecting the other end of the arms 72 and 74. As clearly shown in FIG. 4, the arms and web of the tab 70 are spaced substantially from the edges of the tab 68, and the free end of the tab 68 is thus permitted substantial movement toward the web 76 in the common general plane of the tabs. As most clearly shown in FIG. 7, the end portions of the arms of the tab 70 connected to the members 62 and 64 are preferably provided with a convexo-concave cross section generally conforming to the cross section of the underlying members 62 and 64. As further shown in FIG. 7, the end of the member 66 connected to the tab 68 is flattened in the region of its longitudinal edges to provide better contact with the overlying tab for a more rigid connection to the tab.

Figures 8, 9:
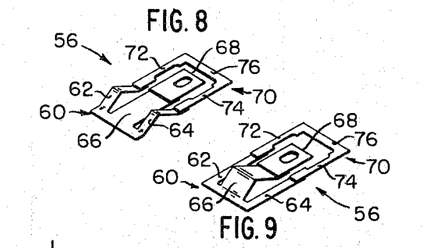
FIG. 8 is a reduced perspective view of the connector of FIG. 4 illustrating the mode of operation during overloading of the connector in one direction.
FIG. 9 is a reduced perspective view of the connector of FIG. 4 showing the mode of operation during overloading of the connector in the direction opposite that of FIG. 8.

As shown in FIG. 3, the free end of the tab 70 is suitably rigidly connected, such as by welding, to the movable wall 38 of the diaphragm 14 with the connector extending at right angles to the wall. Accordingly, as the wall 38 moves to the left, as viewed in FIG. 3, the force representing the differential fluid pressure across the wall 38 will be transmitted longitudinally through the members 62 and 64, and then longitudinally through the center member 66 and tab 68 to the rod 54. The force will be similarly transmitted from the wall 38 to the rod 54 when the wall moves in the opposite direction. When the wall 38 moves to the left, the tab arms 72 and 74 and the convexo-concave members 62 and 64 will be in compression, while the center member 66 will be in tension. With reference to FIG. 8, when the loading of the connector exceeds a predetermined amount, the convexo-concave members 62 and 64 will be deformed out of their general plane and into a generally V-shaped configuration. In this collapsed form, the cross section of the members, at the apex of the V, will be substantially linear. The force transmissibility of the members 62 and 64 in a direction parallel to the general plane of the members will be substantially less than unity when these members are in their collapsed condition. Similarly, when the wall 38 is moved to the right, as viewed in FIG. 3, the outer convexo-concave members 62 and 64 will be in tension while the center convexo-concave member 66 will be in compression. Accordingly, as shown in FIG. 9, when the loading of the connector exceeds a predetermined amount, the center convexo-concave member 66 will collapse into a generally V-shaped configuration, wherein the cross section of the member at the apex of the V is substantially linear and the force transmissibility of the members is less than unity.

Figure 10:
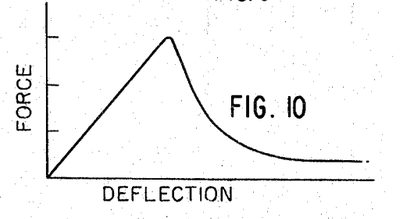
FIG. 10 is a graphical representation of the force-deflection characteristic of the connector of FIG. 4.

The mode of operation of the force limiting connector 56 can perhaps better be understood by reference to FIG. 10, which graphically represents the force versus deflection characteristics of the connector. The ordinate of FIG. 10 is the force applied to the connector by the sensing bellows 14. The abscissa is the relative displacement of the tabs 76 and 69 by the applied force. As can be seen during the initial loading, the stiffness of the connector is unity and the relative displacement of tabs is proportioned to the force applied. However, when the load exceeds a predetermined value, the stiffness of the connector is reduced by the deformation thereof. Accordingly, a lesser force will provide increased displacement. In other words, the continued displacement of the bellows will not be represented as an increased force on the rod 54. Accordingly, it will be apparent that once the center convexo-concave member has begun to collapse, the connector will not transmit any further increases in force from the diaphragm 14 to the rod 54.

The force transmissibility of the connector will again rise if the tab 68 is displaced, relative to the tab 70, in a rightward direction, as viewed in FIG. 8, sufficient to engage the tabs. This will also be true if the tab 68 is displaced to the left, a viewed in FIG. 9, until the legs of the V-shaped configuration engage each other. Therefore, in accordance with this invention, the mode of operation of the connector 56 is related to the sealing of the pressure sensing bellows 14 from the higher input pressure. More specifically, the connector 56 is dimensioned so that the force at which the connector collapses is slightly greater than the force exerted by the bellows at the nominal maximum differential pressure limit of the transducer, for example, 10 p.s.i. Further, the connector is constructed so that its region of low force transmissibility will extend at least to the pressure differential across the bellows at which the bellows is sealed from the higher fluid pressure. The connector 56 is, of course, frictionless in operation and therefore imparts no mechanical hysteresis to the system which could impair the accuracy of the transducer. Also, the connector, particularly the deformable portion thereof, is fabricated from a suitably resilient metal, such as spring steel, whereby when an overload is taken off the connector, the connector will spring back to its original undeformed shape wherein its force transmissibility is unity. In a specific example of a connector of this invention, the base section thereof comprising the tabs 68 and 70 was approximately .010″ in thickness. The deformable portion of the connector on the other hand was approximately .002″ in thickness. The planar dimensions of the connector were approximately ¼″ for width and approximately ⅝″ for length.

Thus, it can be seen that there has been provided a novel and improved fluid pressure differential sensing transducer wherein a single differential fluid pressure sensing member is utilized to provide a displacement in response to changes in the differential fluid pressure being sensed. In accordance with the invention, novel and improved means are provided to seal the differential pressure sensing member from the fluid of higher pressure when the differential pressure across the sensing member exceeds a predetermined amount. Further, novel and improved means are provided to limit the force applied by the sensing member to an external force sensing means to assure that the force sensing means are not overloaded. More specifically, the force limiting means has the characteristic of limiting the maximum force which may be transmitted to the force sensing means to a predetermined value which corresponds to a pressure differential slightly greater than the nominal range of the transducer. Accordingly, during operation of the transducer at a pressure differential exceeding its nominal range, but less than its maximum overload range, the force transmitted by the force sensing member to the force sensing means will be limited independently of the displacement of the differential fluid pressure sensing member. It will be apparent that the differential fluid pressure responsive device described above is particularly adapted for use in a transducer of the type described, and it may also find utility in other applications. Also, it will be apparent that the force limiting connector described above, which is particularly adapted for use in a transducer of the type described, may also find utility in other force transmission systems wherein it is desired to limit the force which may be transmitted through the system while at the same time providing complete recovery of the force transmissibility of the system when the overload force is removed.

Figure 11:
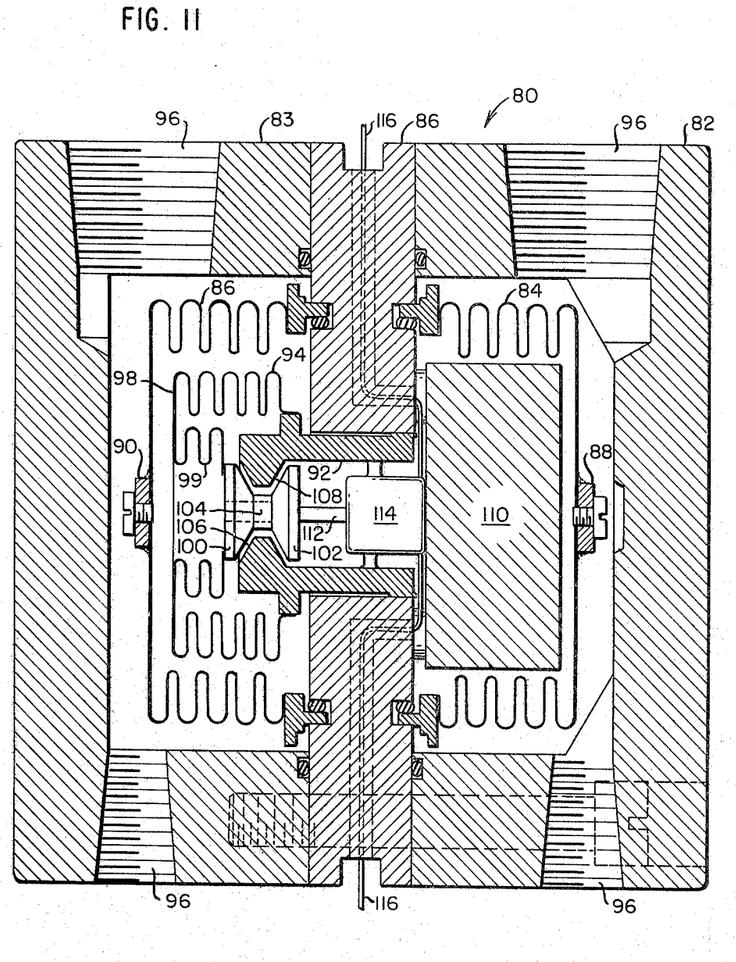
FIG. 11 is a cross sectional view of an alternative embodiment of a differential pressure sensing transducer incorporating the present invention.

With reference to FIG. 11 there will now be described an alternative embodiment of a transducer incorporating the present invention. The transducer of FIG. 11 comprises a housing 80 formed by a pair of housing sections 82 and 83 which are suitably mounted in sealed relation on opposite sides of intermediate member 85. The member 85 forms an inner partition in the housing 80 separating the interiors of the body members 82 and 83. Disposed within the body members 82 and 83, and on opposite sides of the partition 85 are a pair of bellows 84 and 86. The bellows 84 and 86 are adjustably mounted on the partition 85 in the same manner and for the same purpose as the bellows 20 and 22 of the embodiment of FIG. 1. Suitable filler means, generally indicated at 88 and 90, are provided to permit introduction and withdrawal of fluid from within the bellows 84 and 86.

The partition 85 is provided with a central aperture in which is mounted a supporting member 92. The supporting member 92 is mounted on the partition 85 in fluid tight relation. Disposed within the bellows 86 is a bellows 94 which has one end mounted in fluid tight relation on an annular raised portion of the supporting member 92. As can be seen from FIG. 11, the bellows 84, 86 and 94 are arranged in coaxial relation relative to an axis extending at right angles to the partition 85. The bellows 84 and 86 correspond in function to the bellows 20 and 22 described in connection with the embodiment of FIG. 1. The bellows 94 corresponds in function to the bellows 14 previously described. As in the case of the bellows 20 and 22, the bellows 84 and 86 preferably have a relatively low stiffness so that when the bellows are filled with a substantially incompressible fluid any pressures exerted externally of the bellows will be transmitted to the substantially incompressible fluid filling the bellows with substantially no pressure drop. The bellows 94, like the bellows 14, has a stiffness substantially greater than that of the input bellows 84 and 86. In order to provide for introduction of liquid into the housing externally of the bellows 84 and 86, a plurality of inlet and outlet openings 96 are provided in the body sections 82 and 84.

Mounted on the free end 98 of the sensing bellows 94 is one end of a reentrant bellows 99 extending coaxially within the bellows 94. The bellows 99 has the same stiffness as the bellows 94. The inner end of the bellows 99 is mounted on a pair of valve members 100 and 102 which are joined together for simultaneous movement by a stem 104. The valve members 100 and 102 are provided with generally frusto-conical surfaces arranged coaxially of the bellows 94 and facing each other in spaced apart relation. The frusto-conical surfaces of the valve members cooperate with correspondingly shaped surfaces formed internally of a portion of the support member 92 projecting internally of the bellows 94. These surfaces 106, 108 form valve seats which cooperate with the valve members 100 and 102 to control the flow of fluid into and out of the bellows 94, or more specifically the space between the bellows 94 and bellows 99.

As in the case of the embodiment of FIG. 1, the embodiment of FIG. 11 is constructed to provide two sealed chambers of equal volume on opposite sides of the sensing member or bellows 94. One of these sealed expansible chambers is formed by the partition 85 and the space within the bellows 86 externally of the bellows 94 and 99. The other of these sealed expansible chambers is formed by the partition 85 and the interior of the bellows 94, the interior of the supporting member 92, the connecting passages through the valve members 100 and 102 and cooperating valve seats 106, 108 and the interior of the bellows 84. Inasmuch as the interior of the bellows 86 is filled to a substantial extent by the bellows 94 and 99 and in view of the space within the supporting member 92, a filler block 110 is mounted on the partition 85 within the bellows 84 to fill this bellows to a substantial extent and thereby reduce the volume therein which may be filled with fluid. The block 110 is mounted so as to provide fluid flow between the block and the partition 85 then is selected to be of a size which will provide that the volume of the expansible chambers just described will be of substantially equal volume. The fine adjustment of the volume of these chambers is accomplished by adjustment of the bellows 84 and 86 toward and away from a partition 85 in the manner described in connection with the embodiment of FIG. 1 with respect to the bellows 20 and 22.

The valve members 100 and 102 are connected by a force limiting device 112, to be hereinafter described in detail, to a force sensing means 114. The force sensing means is in the specific embodiment shown of the type disclosed in our Patent No. 2,913,693 and is of the strain gage type. A plurality of electrical leads 116, 118 extend from the force sensing means 114 outwardly of the housing 80 for connection to a suitable external device.

In the operation of the embodiment of FIG. 11, fluids of different pressures are introduced into the body sections 82 and 84, respectively, externally of the bellows 84 and 86. The differential pressure of these fluids is transmitted from the bellows 84, 86 by substantially incompressible liquid, such as silicone oil, filling the sealed expansible chambers formed, in part, by the bellows 84 and 86 to the opposite sides of the sensing bellows 94 and reentrant bellows 99. When the pressure externally of the bellows 94 exceeds the pressure internally of the bellows by a predetermined amount, the valve 100 will be engaged with the valve seat 106 to prevent any further flow of liquid from within the bellows 94 into the bellows 84. Thus, the valve 100 will trap the then present substantially incompressible liquid between the bellows 94 and valve 100. Theoretically, any further increase in the pressure externally of the bellows 94 will not cause any further displacement of the bellows due to the incompressibility of the liquid trapped in the bellows, and in this connection it is important to assure that there is no air in the bellows 94 which could be compressed after seating of the valve 100. It will be realized that the silicone oil in the bellows 94 will not be completely incompressible. Therefore, without the bellows 99 when the pressure externally of the bellows 94 increases following seating of the valve 100, there would be a tendency for the bellows 94 to be undesirably deformed in a manner which can cause fracture. However, the provision of the bellows 99 connecting the free end of the bellows 94 to the valve 100 permits the bellows 94 to compress normally as the fluid therein is compressed and eliminates danger of fracture of the bellows 94.

When the pressure in the bellows 84 exceeds the pressure in the bellows 86 by a predetermined amount, the valve 102 will be seated on the valve seat 108 so as to seal the interior of the bellows 94 from the input bellows 84. Accordingly, any further rise in pressure in the bellows 84 will not be transmitted internally of the bellows 94. When the pressure differential across the bellows 94 is zero, the valves 100, 102 will be equally spaced from their respective valve seats. The range of movement of the valves 100, 102 from their rest position should correspond to a pressure differential across the bellows 94 which is in excess of the nominal rating of the transducer for the reasons described in connection with the embodiment of FIG. 1.

Figure 12:
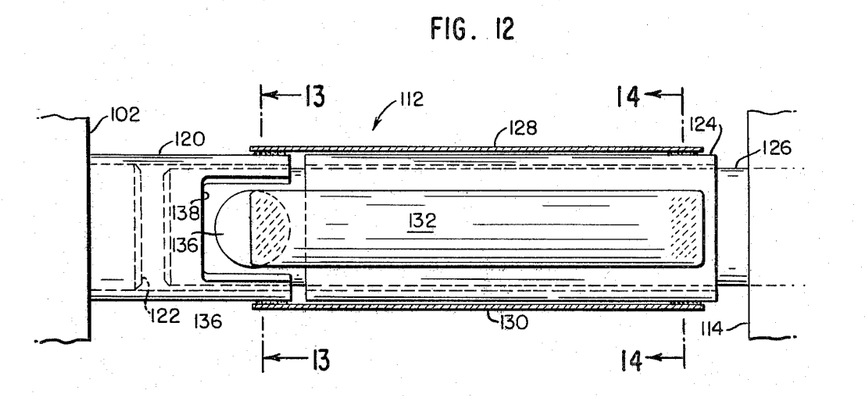
FIG. 12 is an enlarged side view, partly in section, of the force limiting means of the transducer of FIG. 11.
Figure 13:
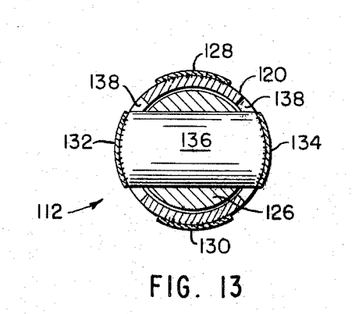
FIG. 13 is a cross sectional view substantially along the line 13—13 of FIG. 12.
Figure 14:
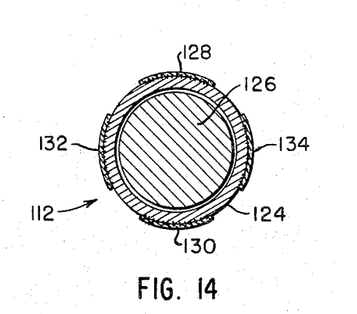
FIG. 14 is a cross sectional view substantially along the line 14—14 of FIG. 12.

With reference to FIGS. 12 to 14, the force limiting connector 112 will now be described. This connector is similar in principle to the connector of FIGS. 3 to 10 though differing in specific structure. The connector 112 comprises a sleeve 120 telescopically but fixedly mounted on a projection 122 extending coaxially of the valve 102 and mounted for movement with the valve. The connector 112 further includes a second sleeve 124 of the same diameter of the sleeve 120. The sleeves 120 and 124 are arranged end to end in coaxial, spaced relation. Disposed within the aligned sleeves 120 and 124 is a cylindrical rod 126. The rod 126 is slightly radially spaced from the inner walls of the sleeves 120 and 124 although it may be slidably engaged thereon. One end of the rod 126 is drivingly connected to the force sensing means 114. The other end of the rod, as shown in FIG. 12, projects within the sleeve 120 so that the sleeve 124 is disposed between the sleeve 120 and the driving end of the rod 126. A pair of thin resilient metallic strips 128, 130 are fixedly connected at their opposite ends to the sleeves 124 and 120. As shown in FIG. 12, the connection of the strips to the sleeve 124 is made closely adjacent the end of the sleeve 124 remote from the sleeve 120. The other ends of the strips 128, 130 are connected to the sleeve 120 at the end thereof next adjacent the sleeve 124. The strips 128 and 130 are laterally curved, or bowed, to have a cross section corresponding generally to the curvature of the sleeves 120 and 124. A second pair of thin resilient metallic strips 132 and 134 are connected at their opposite ends respectively between the sleeve 124 and the rod 126. The strips 132, 134 are identical with the strips 128, 130 and are connected to the sleeve 124 at the same end of the sleeve as are the strips 128, 130. As shown in FIGS. 12 to 14, the strips 128, 130, 132 and 134 each extend longitudinally of the sleeve 124 and are arranged circumferentially about the sleeve with the strips 128, 130 being on opposite sides of the sleeve from each other as are the strips 132 and 134. Also, the strips 128 and 130 are offset from the pair of strips 132 and 134 ninety degrees about the longitudinal axis of the sleeves 120, 124.

As most clearly shown in FIGS. 12 and 13, the portion of the rod 126 extending into the sleeve 120 is provided with a pair of diametrically opposed raised portions formed by the ends of a pin 136 which extends diametrically through the rod 126. The sleeve 120 is cut away as at 138 to accommodate the projecting ends of the pin 136. Further, as shown in FIGS. 12 and 13, one end of each of the strips 132 and 134 is mounted on the corresponding ends of the pin 136 to connect this end of each strip 132 and 134 for movement with the rod 126.

With reference to FIG. 12, when the valve 102 is moved to the right, the sleeve 120 will also be moved to the right. As the sleeve 120 moves to the right, the strips 128, 130 will be in compression and will cause the sleeve 124 to be moved to the right. The strips 132, 134 will now be in tension and will cause the rod 126 to be moved to the right. When the force exerted on the sleeve 120 exceeds a predetermined amount, the strips 128 and 130 will collapse radially outwardly of the sleeve 124 into a generally V-shaped configuration, such as is shown in connection with the legs 62 and 64 of the connector 56 previously described. Also, in a like manner, the force transmissibility of the connector will be reduced due to the collapse of the strips 128 and 130. Correspondingly, when the sleeve 120 is moved to the left as viewed in FIG. 12, the strips 128, 130 will be in tension while the strips 132, 134 will be in compression. Accordingly, on exertion of a predetermined force on the sleeve 120 in a leftward direction, the strips 132 and 134 will collapse radially outwardly into a generally V-shaped configuration.

As noted above, and as can be seen from FIGS. 13 and 14, the strips 128, 130, 132 and 134 conform in cross section to the tubes 120 and 124 and lie in nesting engagement therewith. However, if desired the strips may be inverted so that their convex sides engage the tubes 120 and 124. With the strips so oriented, they will not be permitted to collapse in the direction of their convex sides but will be permitted to collapse in the direction of their concave sides. In this latter case, more force, longitudinally of the strips, will be required to cause them to collapse outwardly of the tubes 120, 124 than in the case of the structure specifically shown in FIGS. 12–14 of the drawings. Thus, for a given length, breadth, thickness and cross sectional configuration of the strips 128, 130, 132 and 134 the force at which the strips collapse may be varied by the orientation of the strips, as described.

It should be noted that during movement of the sleeve 120 to the left, as viewed in FIG. 12, and after collapse of the strips 132 and 134, further movement of the sleeve 120 to the left will cause the end of the sleeve 124 next adjacent the sleeve 120 to engage the pin 136 and thereby preclude further deformation of the strips 132 and 134. Correspondingly, during movement of the sleeve 120 to the right, and following collapse of the strips 128, 130 sufficient movement of the sleeve 120 to the right will cause the next adjacent ends of the sleeves 120 and 124 to be engaged to limit further deformation of the strips 128, 130. As in the case of the force limiting connector 56, the connector 112 is constructed so that its region of low force transmissibility will extend at least to the pressure differential across the sensing bellows at which the sensing bellows is sealed from the high fluid pressure. In other words, the above described engagement between the pin 136 and end of the sleeve 124, as well as the above described engagement of the next adjacent ends of the sleeves 120, 124, should not occur within the maximum pressure differential range of the transducer. The connection 112 is, of course, frictionless in operation and therefore as in the case of the connector 56 imparts no mechanical hysteresis of the system, which could impair the accuracy of the transducer. Also, the strips 128, 130, 132 and 134 are preferably fabricated from a suitable resilient metal such as spring steel so that they will spring back to their original position when an overload force is removed.

Figure 15:
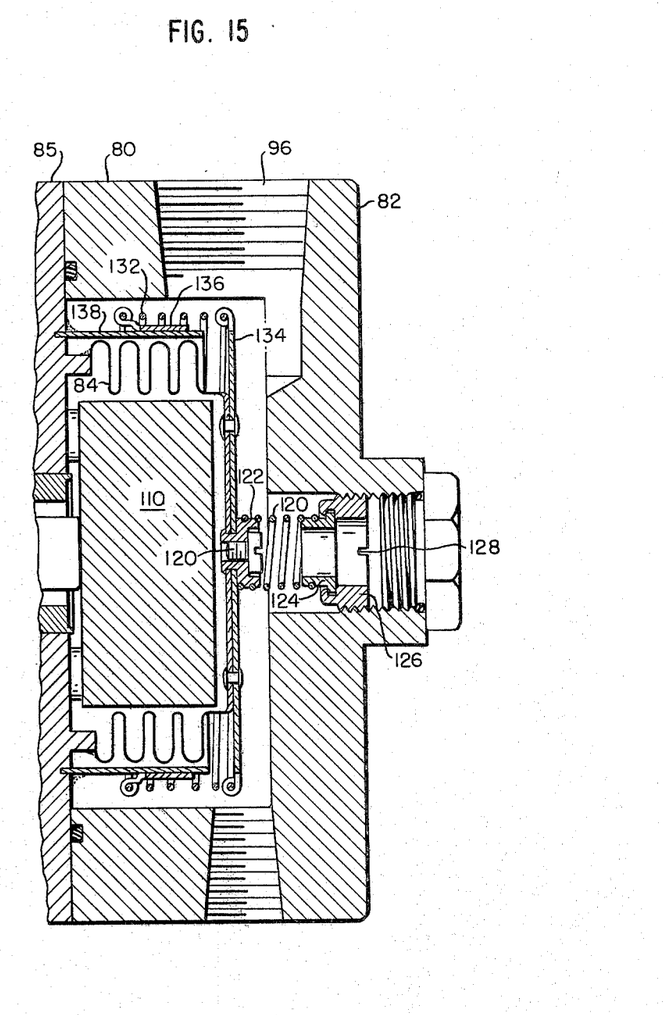
FIG. 15 is a fragmentary cross sectional view of a modified form of the transducer of FIG. 11.

With reference to FIG. 15, there is shown alternative means for compensating the transducer of FIG. 11 for variations in temperature of the liquid in the sealed chambers as well as for variations in line pressure externally of the input bellows. While the basic structure shown is similar to that of FIG. 11, it will be understood that the modifications and additions apply equally well to the structure of FIG. 1. It should be apparent from the above that our transducer is characterized by being provided with two sealed chambers on opposite sides of the differential fluid pressure sensing member and thus distinguishes over conventional prior art devices of this type wherein only a single sealed chamber is utilized. One of the advantages of our device is that the provision of two sealed chambers provides the ability to compensate better for fluctuations in temperature and pressure. Further, the use of a strain gage for sensing movement of the differential fluid pressure sensing member permits the measurement of very small displacements, and thus pressure differences and at the same time provide better dynamic characteristic. However, the use of a strain gage device for measuring the output of the sensing bellows requires that the sensing bellows have a travel which is very substantially less than that of the corresponding member of usual devices. For example, in our device, the center or inner bellows might have a displacement on the order of .0005 inch as opposed to several thousandths of an inch in the more conventional devices. Therefore, our device is quite sensitive to temperature variations of the fluid in the sealed chambers as well as to changes in the line pressure on the input bellows.

As was noted above, it is desired that the volumes of liquid in the sealed chambers be equal so that variations in temperature and pressure will not cause errors in the output. With our structure this requirement is much more critical than with prior devices of this type. The output error signal due to a change in temperature of the liquid in the sealed chambers can be expressed as follows:

$$\frac{P_t}{T} = \frac{C_v}{A^2}(K_1V_1 - K_2V_2)$$

Where $P_t$ is the error signal in terms of the pressure rise due to the temperature of the liquid in the sealed chambers;

T is the temperature of the liquid in the sealed chambers;

$C_v$ is the temperature coefficient of expansion of the liquid;

$A^2$ is the effective area of the sensing bellows;

$K_1$ and $K_2$ are the stiffnesses of the input bellows; and $V_1$ and $V_2$ are the volumes of the sealed chambers on the opposite sides of the differential fluid pressure sensing member.

The effect of a change in line pressure on the output of the transducer can be expressed as follows:

$$\frac{\Delta p}{P} = \frac{1}{A^2 E_b}(K_1V_1 - K_2V_2)$$

Where

Δp is the error signal when the line pressures are equal on both input bellows;
P is the line pressure; and
$E_b$ is the bulk modulus of elasticity of the liquid in the sealed chambers.

We can assume that $E_b$ and $C_v$ are constant. Accordingly, if the function $(K_1V_1 - K_2V_2)$ is kept at zero we can eliminate any error in the output of the transducer due to increase in line pressure or temperature of the liquid in the sealed chambers. This may be accomplished by adjusting either the stiffness of the bellows or the volume within one of the bellows. As described in connection with FIGS. 1 and 11, the compensation is accomplished by adjusting the volume within the bellows. However, as shown in FIG. 15, volume adjustment of the bellows may be accomplished by means other than moving the bellows relative to the intermediate member 85. In the embodiment of FIG. 15, the bellows 84 is anchored directly on an annular raised portion on the intermediate member 85. A spring 120 is anchored at one end on a boss or the like 122 mounted centrally of the movable wall of the bellows 84. The other end of the spring 120 is anchored to a sleeve 124 rotatably mounted on an externally threaded sleeve 126 mounted on the end plate 82. The sleeve 126 is provided with notches 128 for engagement with a tool whereby the sleeve may be threaded toward and away from the bellows 84 to vary the preloading of the spring 120. It will be apparent that the preloading of the spring 120 will vary the volume of the bellows 84 due to the fact that the liquid filling the bellows is not completely incompressible. Thus, adjustment of bellows volume can be accomplished when no line pressure is applied externally of the bellows. The output of the strain gage sensing means may of course be zeroized by suitable known electrical means. A filler plug 130 is provided in the movable wall of the diaphragm 84 for adjusting the volume of liquid within the bellows, if desired.

Also shown in FIG. 15 is means for varying the stiffness of the bellows 94. More specifically, a spring 132 is connected between the movable wall of the bellows 84 and the fixed intermediate member 85 of the housing. The spring 132 is connected at one end to a spider or the like 134 mounted on the movable wall of the bellows. The other end of the spring is connected to one end of a tubular member 136 which is arranged coaxially over the bellows 84. The tube 136 is press fit over another tubular member 138 extending coaxially about the bellows 84 in spaced relation thereto. The tube 138 is fixed to the partition 85 such as by welding. As will be apparent, the spring 132 may be either a compression or a tension spring so as to increase or decrease the stiffness of the bellows with respect to expansion thereof. By using spring of different stiffness, the overall stiffness of the bellows may be varied so as to provide that the kv. factor of the foregoing formula will be equal with respect to both input bellows.

While the preloading spring 120 and spring 132 have been shown in the same device in FIG. 15, it will be understood that either one or both could be utilized together. Although the springs 120 and 132 have been shown in association with only one of the input bellows, it will be understood that similar springs could be provided for the other input bellows as well. Further, the spring 132 could be utilized in conjunction with a volume adjusting arrangement such as shown in the embodiment of FIGS. 1 and 11. Also, as will be apparent, the initial tension or compression of the spring 132 may be varied by the adjustable positioning of the tube 136 on the tube 138.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having thus described our invention, we claim:

1. In combination: a force sensing transducer, a displaceable member providing the input to the transducer, and means connecting the displaceable member and transducer including a force limiting connector comprising a pair of elongated resiliently flexible members extending parallel to each other, at least one of said members having a convexo-concave cross section, means joining one end of one of said members to the corresponding end of the other member for movement therewith in a direction longitudinally thereof, and means connecting the other ends of said flexible members between said displaceable member and transducer for transmission of force through said connector in a direction extending parallel to said flexible members.

2. A force transmitting connector having a first force transmissibility over an initial range of loading thereof and a substantially lesser second force transmissibility over a subsequent higher range thereof comprising an elongated resiliently flexible linear member having a convexoconcave cross section, and means for connecting the ends of said member to a pair of relatively movable force transmitting members for transmission of a force in a direction extending parallel to said flexible member.

3. A force transmitting connector having a first force transmissibility over an initial range of loading thereof and a substantially lesser second force transmissibility over a subsequent higher range thereof comprising a pair of elongated resiliently flexible members extending parallel to each other, each of said member having a convexo-concave cross section, means joining one end of one member to the corresponding ends of the other member for movement therewith and means for connecting the other ends of said members to a pair of relatively movable force transmitting members for transmission of force through said connector in a direction extending parallel to said flexible members.

4. A force transmitting connector having a first force transmissibility over an initial range of loading thereof and a substantially lesser second force transmissibility over a subsequent higher range thereof comprising a pair of spaced apart, parallel, elongated resiliently flexible members, a third elongated resiliently flexible member extending parallel to and disposed between said pair of members, each of said flexible members having a convex-concave cross section, means joining one end of said third flexible member to the corresponding ends of said pair of flexible members for movement therewith, and means for connecting the other ends of said pair of members and the other end of said third member respectively to a pair of relatively movable force transmitting members for transmission of force through said connection in a direction extending parallel to the flexible members.

5. A force transmitting connector having a first force transmissibility over an initial range of loading thereof and a substantially lesser second force transmissibility over a subsequent higher range thereof comprising a pair of parallel spaced elongated resiliently flexible members, a third elongated resiliently flexible member extending parallel to and spaced between said pair of members, all of the flexible members lying in a common general plane and each having a convexo-concave cross section, means joining one end of said third member to the corresponding ends of said pair of members for movement therewith in the said general plane, a relatively rigid member mounted on the other ends of said pair of members for connecting the same to a force transmitting member, and a relatively rigid member mounted on the other end of said third flexible member for connection of said third member to a second force transmitting member.

6. A force transmitting connector having a first force transmissibility over an initial range of loading thereof and a substantially lesser second force transmissibility over a subsequent higher range thereof comprising, a pair of aligned spaced apart cylindrical members, a third member disposed within at least one of said pair of cylindrical members, a pair of elongated convexo-concave cross sectional flexible members extending parallel to said pair of cylindrical members and spaced angularly about said cylindrical members, the corresponding ends of said pair of flexible members being fixed to said one cylindrical member, the other ends of said pair of flexible members being fixed to the other cylindrical member and said third member respectively.

7. A force transmitting connector having a first force transmissibility over an initial range of loading thereof and a substantially lesser second force transmissibility over a subsequent higher range thereof as described in claim 6 in which the concave side of said flexible member is juxtaposed with the outer surface of said cylindrical members.

References Cited by the Examiner
UNITED STATES PATENTS

| | | | |
|---|---|---|---|
| 1,648,375 | 11/1927 | Whittemore et al. | 73—141 |
| 1,650,789 | 11/1927 | Doolittle | 73—141 |
| 2,634,122 | 4/1953 | Wolfard | 267—1 |
| 2,690,079 | 9/1954 | Moreschel | 73—407 |
| 2,752,949 | 7/1956 | Jones | 73—406 |
| 2,808,725 | 10/1957 | Booth et al. | 73—406 |
| 2,979,908 | 4/1961 | Stover | 73—407 |
| 3,115,337 | 12/1963 | Musgrave | 267—1 |
| 3,140,613 | 7/1964 | Hasegawa | 73—407 |

LOUIS R. PRINCE, *Primary Examiner.*

DAVID SCHONBERG, *Examiner.*

DONALD O. WOODIEL, *Assistant Examiner.*